(12) United States Patent
Weldon

(10) Patent No.: US 6,386,557 B1
(45) Date of Patent: May 14, 2002

(54) PORTABLE COOLER CADDY AND CUP HOLDER

(75) Inventor: Charles M. Weldon, Richmond, VA (US)

(73) Assignee: Waterbuggy, LLC, Richmond, VA (US)

( * ) Notice: Subject to any disclaimer, the term of this patent is extended or adjusted under 35 U.S.C. 154(b) by 0 days.

(21) Appl. No.: 09/722,636

(22) Filed: Nov. 28, 2000

(51) Int. Cl.⁷ .................................................. B62B 1/04
(52) U.S. Cl. ............................. 280/30; 108/12; 108/18; 280/654; 280/47.18; 280/47.19; 280/47.28
(58) Field of Search ............................. 108/11, 12, 18; 280/30, 47.28, 47.25, 47.26, 47.27, 47.18, 47.19, 651, 652, 654, 655

(56) References Cited

U.S. PATENT DOCUMENTS

| | | | |
|---|---|---|---|
| 478,891 A | * | 7/1892 | Schmirk ....................... 108/11 |
| 2,831,698 A | | 4/1958 | Mills |
| 2,842,373 A | * | 7/1958 | Duerr ....................... 280/47.28 |
| 3,889,967 A | | 6/1975 | Sauer |
| 3,997,181 A | | 12/1976 | Jaco et al. |
| 4,179,132 A | | 12/1979 | Rich |
| 4,241,930 A | | 12/1980 | Bell et al. |
| 4,284,286 A | * | 8/1981 | Lewallen ....................... 280/30 |
| 4,369,985 A | | 1/1983 | Bourgraf et al. |
| D270,391 S | | 8/1983 | Bergquiest et al. |
| 4,448,434 A | | 5/1984 | Anderson |
| 4,451,053 A | | 5/1984 | Alioa et al. |
| 4,457,527 A | | 7/1984 | Lowery |
| 4,493,492 A | | 1/1985 | Balabanova |
| 4,630,837 A | | 12/1986 | Kazmark |
| 4,724,681 A | | 2/1988 | Bartholomew et al. |
| 4,759,559 A | | 7/1988 | Moulton |
| D297,079 S | | 8/1988 | Weldon |
| 4,793,647 A | | 12/1988 | Marvin |
| 4,846,493 A | | 7/1989 | Mason |

(List continued on next page.)

Primary Examiner—Michael Mar
(74) Attorney, Agent, or Firm—John H. Thomas, P.C.

(57) ABSTRACT

A portable cooler caddy includes a cup holder panel. The cooler caddy has a frame and a platform on which is carried a cooler. The platform may further include a support to hold the cooler level when the caddy is in the upright position. The cup holder panel may be releaseably locked into the horizontal position. The cup holder panel has apertures that hold cups that may be used.

4 Claims, 4 Drawing Sheets

U.S. PATENT DOCUMENTS

| | | |
|---|---|---|
| D302,886 S | 8/1989 | Padilla |
| 4,863,075 A | 9/1989 | Romer |
| 4,887,836 A | 12/1989 | Simjian |
| D305,713 S | 1/1990 | Seifried |
| 5,118,063 A | 6/1992 | Young, Sr. |
| 5,154,317 A | 10/1992 | Roppolo, III |
| 5,184,477 A | 2/1993 | Brown et al. |
| 5,193,842 A | 3/1993 | Fontenot |
| 5,306,029 A | 4/1994 | Kaiser, II |
| 5,333,885 A | 8/1994 | Pullman |
| 5,362,078 A | 11/1994 | Paton |
| D356,410 S | 3/1995 | Cole |
| D358,072 S | 5/1995 | Hutniak |
| 5,468,005 A | 11/1995 | Yang |
| 5,474,312 A | 12/1995 | Starita et al. |
| 5,480,078 A | 1/1996 | Verrette et al. |
| 5,599,037 A | 2/1997 | Spickler |
| 5,609,318 A | 3/1997 | Scheh |
| 5,626,353 A | 5/1997 | Campbell |
| 5,636,852 A | 6/1997 | Sistrunk et al. |
| 5,649,718 A | 7/1997 | Groglio |
| 5,713,583 A | 2/1998 | Hansen |
| 5,727,719 A | 3/1998 | Veliz et al. |
| 5,765,868 A | 6/1998 | Ventrone et al. |
| 5,785,329 A | 7/1998 | Stanley |
| 5,797,612 A | 8/1998 | Buccioni |
| 5,823,360 A | 10/1998 | Gorosave |
| 5,833,250 A | 11/1998 | Schier et al. |
| 5,857,695 A | 1/1999 | Crowell |
| 5,913,527 A | 6/1999 | Hailston |
| 5,971,139 A | 10/1999 | Bradley |
| 6,000,713 A * | 12/1999 | Lin .......................... 280/47.28 |
| 6,036,203 A | 3/2000 | Tyus et al. |
| 6,047,866 A | 4/2000 | Brown |
| 6,053,514 A | 4/2000 | Su |
| 6,113,129 A * | 9/2000 | Marques et al. ......... 280/47.28 |
| 6,196,560 B1 * | 3/2001 | Ohlsson ....................... 280/30 |

\* cited by examiner ated to hold the platform in a substantially horizontal orientation when the frame is in an upright position. Further, the support may have a length of at least six inches so that the platform is adapted to be at least six inches above the ground. Still further, the panel can be releaseably locked in parallel or perpendicular positions relative to the orientation of the frame. The panel may further comprise indicia for differentiating each of the plurality of apertures.

PORTABLE COOLER CADDY AND CUP HOLDER

This invention relates to an apparatus for transporting a cooler. More specifically, the invention is a portable cooler caddy and cup holder.

BACKGROUND OF THE INVENTION

In recent years, many team sports have become more and more popular with the increasing participation of children and adults alike. A major issue for participants, coaches and parents is the provision of sufficient fluids for the participants so that there will be no dehydration. This is a particularly difficult chore when teams use public fields and facilities or when they frequently travel, because it is typically not possible to build any permanent structure to facilitate the dispensing of fluids. As a result, many different ways have been improvised to provide fluids.

The traditional way that fluids are provided is that one or more people physically carry a cooler containing bottles or cans of drink or a cooler fall of fluids onto the side of a playing field. Depending on the size of the cooler, this can be a particularly burdensome task. The cooler is then stationary on the side of the field or, at least, difficult to move about. There are numerous drawbacks to this method of providing fluids. If the cooler is placed on the ground, then a spout can get dirty and the top of the cooler would have to be opened which allows dirt and grass to get inside the cooler. The open top also means sharing of all of liquids, and the possible sharing of germs and viruses. If the cooler is lifted above the ground, then it takes up space on a bench or chair. Additionally, the actual process of lifting the cooler is heavy work. It also creates the potentially unsafe condition where a child, for instance, could pull the cooler over on him or herself.

Another problem with traditional methods of providing a community cooler includes the problem of cups. If individual cups are used for each drink, then there is much wastage of cups, and there is litter. Additional, on a windy day, cups both clean and dirty can blow away. Inevitably, there is cup sharing between the participants. This is a particularly easy way to spread germs and viruses.

The other way that provision of fluids is typically treated is when the individual participants bring their own coolers and their own drinks. While this is acceptable, it makes the task a burden on everyone. And if one participant forgets, then it is a burden to share liquids between the participants.

SUMMARY OF THE INVENTION

Accordingly, it is an object of the present invention to overcome the shortcomings of existing fluid dispenser systems and provide a portable cooler caddy. The cooler caddy further includes a tray having apertures in it for cups to be organized and held.

The invention is a portable cooler caddy and cup holder including a frame, a plurality of wheels, a platform, and a cup holder. The frame has an upper portion and a lower portion. The wheels are connected to the lower portion of the frame. A platform is attached to one end to the lower portion of the frame and extends outwardly from the frame and is adapted to support a cooler. The cup holder panel is hingedly connected to the upper portion of the frame. The panel includes a plurality of apertures adapted to receive and hold a cup. The upper portion of the frame may comprise a handle with the cup holder panel hingedly connected to the handle. The cooler caddy and cup holder may further include a support adapted to hold the platform in a substantially horizontal orientation when the frame is in an upright position. Further, the support may have a length of at least six inches so that the platform is adapted to be at least six inches above the ground. Still further, the panel can be releaseably locked in parallel or perpendicular positions relative to the orientation of the frame. The panel may further comprise indicia for differentiating each of the plurality of apertures.

In an alternative embodiment, the portable cooler caddy and cup holder includes a frame, a plurality of wheels, a platform and a cup holder panel. The frame has an upper portion and lower portion wherein the upper portion comprises a handle. The plurality of wheels are connected to the lower portion of the frame. A platform is attached on one end to the lower platform of the frame and extends outwardly from the frame and is adapted to support a cooler. The cup holder panel is connected to the handle and comprises a plurality of apertures, each adapted to receive and hold a cup. The handle may be hingedly connected to the upper portion of the frame. The handle may be releaseably locked in parallel and perpendicular positions relative to the orientation of the frame. The platform further comprises a support adapted to hold the platform in a substantially horizontal orientation when the frame is in an upright position. Additionally, the support may have a length of at least six inches so that the platform is adapted to be at least six inches above the ground. The panel may further comprise indicia for differentiating each of the plurality of apertures.

BRIEF DESCRIPTION OF THE DRAWINGS

Various other features and attendant advantages of the present invention will be more fully appreciated as the same becomes better understood when considered in conjunction with the accompany drawings, in which like reference characters designate the same or similar parts throughout the several views, and wherein.

DETAILED DESCRIPTION OF THE PREFERRED EMBODIMENTS

Figure 1:
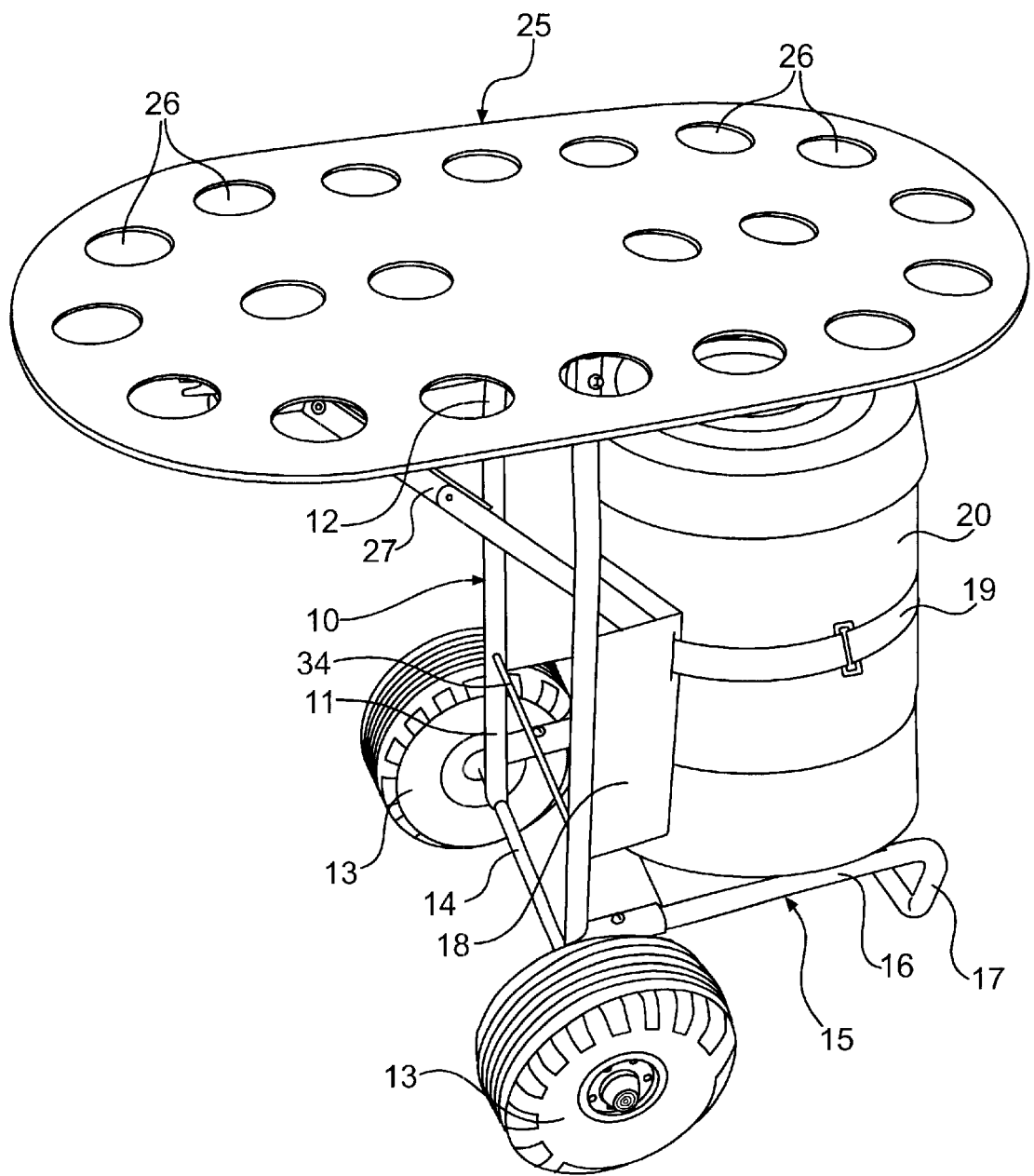
FIG. 1 is a perspective view of the invention wherein the cup holder is in the horizontal position.
Figure 2:
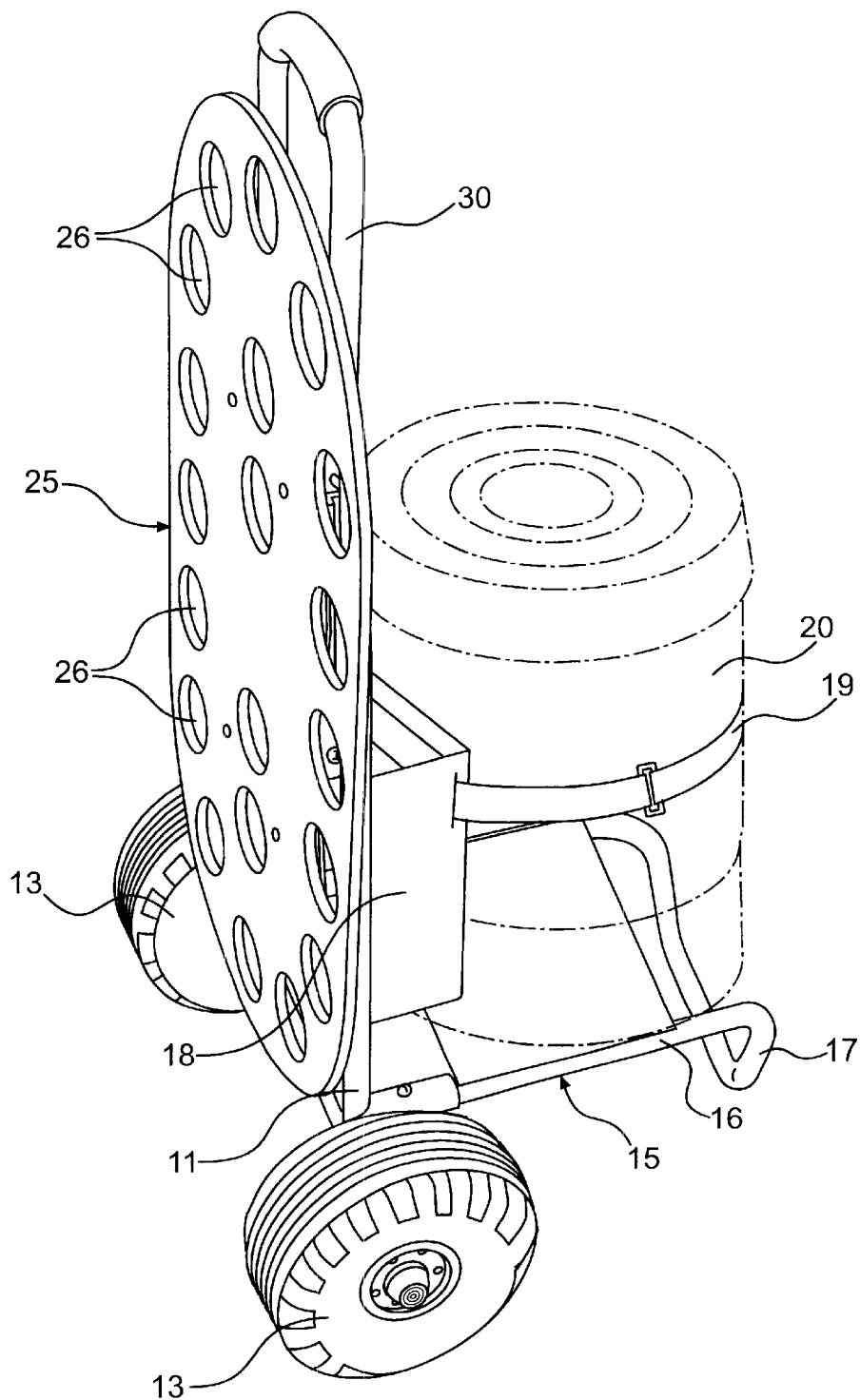
FIG. 2 is a perspective view of the invention wherein the cup holder is in the vertical position.

FIGS. 1 and 2 display perspective views of the cooler caddy and cup holder. FIG. 1 shows the clip holder panel 25 in the down or horizontal position, while FIG. 2 shows the clip holder panel 25 in the upright or vertical position. There is shown a frame 10 having a lower portion 11 and an upper portion 12. Connected via an axle 14 on the lower portion 11 are wheels 13. These wheels allow the entire assembly to be portable and easily movable. The wheels 13 are preferably relatively wide and large so that the cooler caddy may be easily transported across an uneven, grassy/muddy field. In the preferred embodiment, the wheels are about four inches wide and eight inches in diameter.

A platform 15 is connected to the lower portion 11 of the frame 10. The platform protrudes perpendicular to the frame 10. The platform is comprised of the horizontal element 16 and a support 17. The support 17 protrudes downwardly from the platform 15 thereby holding up the platform and allowing the platform to rest on ground or any other surface upon which the caddy is resting in a horizontal orientation. The frame 10 further includes a support bracket 18 which is adapted to receive the side of a cooler like cooler 20 and prevent it from sliding around and off of the platform 15. The cooler 20 is further held in place by a strap 19 that is designed to be tightened around the cooler. In this way, many different sizes and types or brands of coolers may be carried by the frame 10.

The cup holder panel 25 is attached to the upper portion 12 of the frame 10. The cup holder panel 25 is further supported by bracket 27 when the platform is oriented in the horizontal position as shown in FIG. 1. The panel 25 has a plurality of apertures 26 formed in it. Those apertures 26 can be round or any other shape adapted to conveniently hold a cup. In the preferred embodiment, the diameter of the apertures 26 in the panel 25 is about two and a half inches, which is selected to enable many different sized cups to fit within the apertures. The panel 25 may be made of any material such as wood, metal or plastic. A desirable feature of the panel 25 is that it is weatherproof. That is, the cooler caddy and cup holder will be used outdoors very often. It will also be used directly with fluids that may be spilled on it. Therefore, the material that makes up the panel 25 should be able to withstand moisture and other physical wear and tear. In the preferred embodiment, the panel is made up of polyvinyl chloride with a thickness of a quarter inch.

As better shown in FIG. 2, the handle 30 is connected to and makes up a part of the upper portion 12 of the frame 10. As shown in FIG. 2, when the panel 25 is in the vertical or upright position, then the handle is exposed and may be used to tilt the caddy and thereby transport the cooler. The handle 30 may be a fixed or integral part of the upper portion 12 of the frame 10. Alternatively, as shown, the handle is hingedly attached to the upper portion 12 so that it may rotate between the vertical position (FIG. 2) and the horizontal position (FIG. 1).

Figure 3:
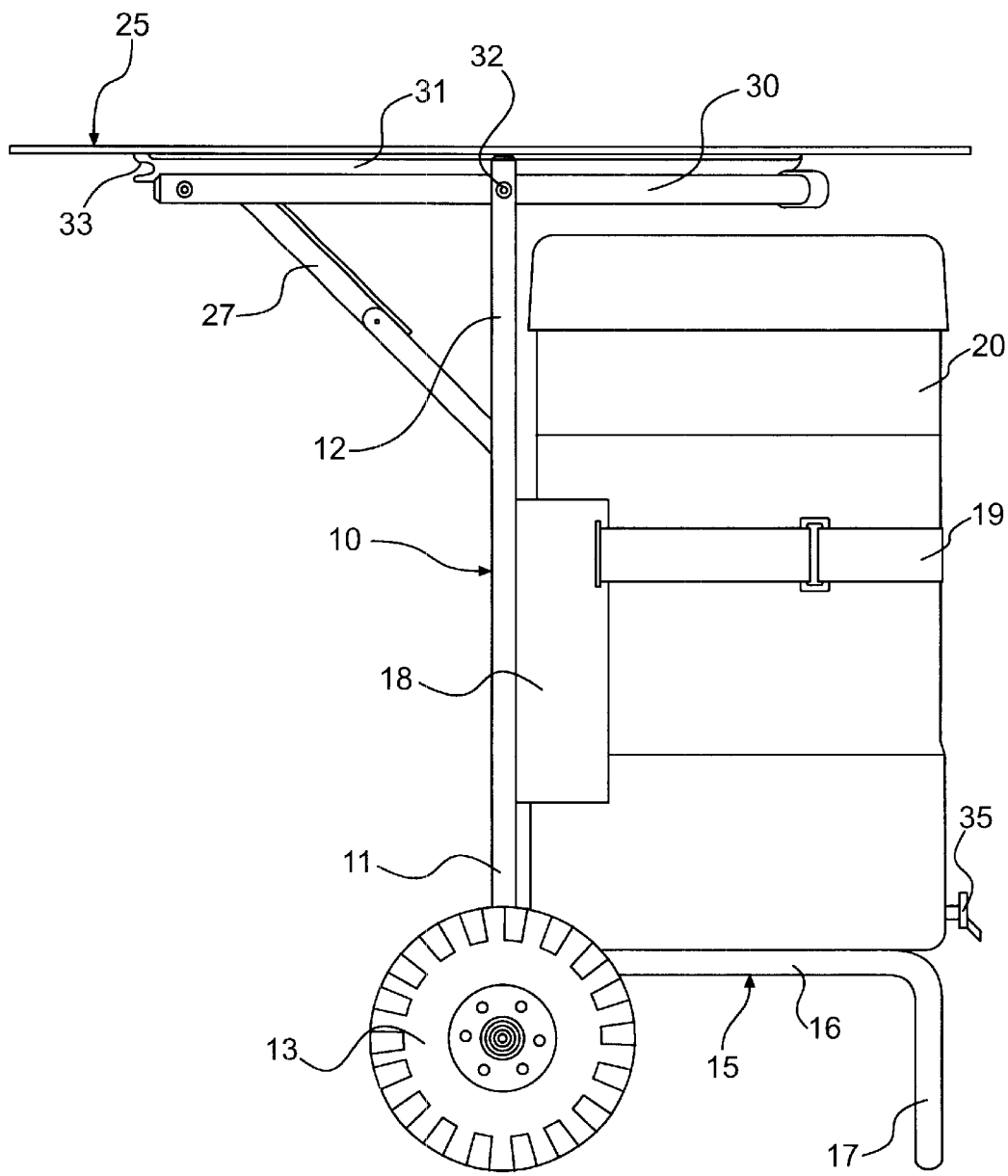
FIG. 3 is a side elevation view of the present invention wherein the cup holder is in the horizontal position.

FIG. 3 illustrates a side elevation view of the cooler caddy carrying a cooler 20 wherein the cup holder panel 25 is in the horizontal position. In this view, it is clearly seen that the cup holder panel 25 is connected to the handle 30 and that the handle 30 is rotated into the horizontal position around the hinge 32 which is in the upper portion 12 of the frame 10. The bracket 27 is mechanically locked in place to hold the panel 25 in the horizontal position. The bracket 27 provides additional support for the handle 32 and therefore the panel 25. The panel 25 is connected to the handle 30 via a slide mechanism 31 that allows the panel 25 to slide into a balanced position directly over the frame 10 when in the horizontal position. When in the vertical position as shown in FIG. 2, the panel 25 may slide into a position that presents the handle 30 for easy access and gripping. At one end of the slide mechanism 31 is a fork 33. In the vertical position, the fork 33 engages the rod 34 and is held in place by gravity, thereby locking the handle 30 in the vertical position.

In FIG. 3, the support 17 is clearly seen. The length of the support 17 (height from the ground or other supporting surface up to the platform) is preferably at least six inches. In this way, cups may be placed under the spout 35 and filled with the fluid that is carried inside the cooler 20. If the support 17 is shorter, then the cooler may be tilted forward and may fall off. Additionally, it would be difficult for someone to fill a cup, because the spout 35 would be too close to the ground or other support surface. This support 17 also is preselected so that the platform 15 is generally horizontal. In other words, the diameter of the wheels 13 are chosen or made compatible with the length of the support 17 so that the platform 15 will be generally horizontal. As shown, the platform 15 is generally perpendicular to the frame 10. There may be other preferable predetermined angles that separate the platform 15 and the frame 10. Nevertheless, the bracket 27 would preferably then be adapted to tilt the panel 25 so that it too was horizontal to the ground or support surface when in the down position. In this way, the panel 25 may easily hold the cups holding liquids and reduce the spillage there from.

Figure 4:
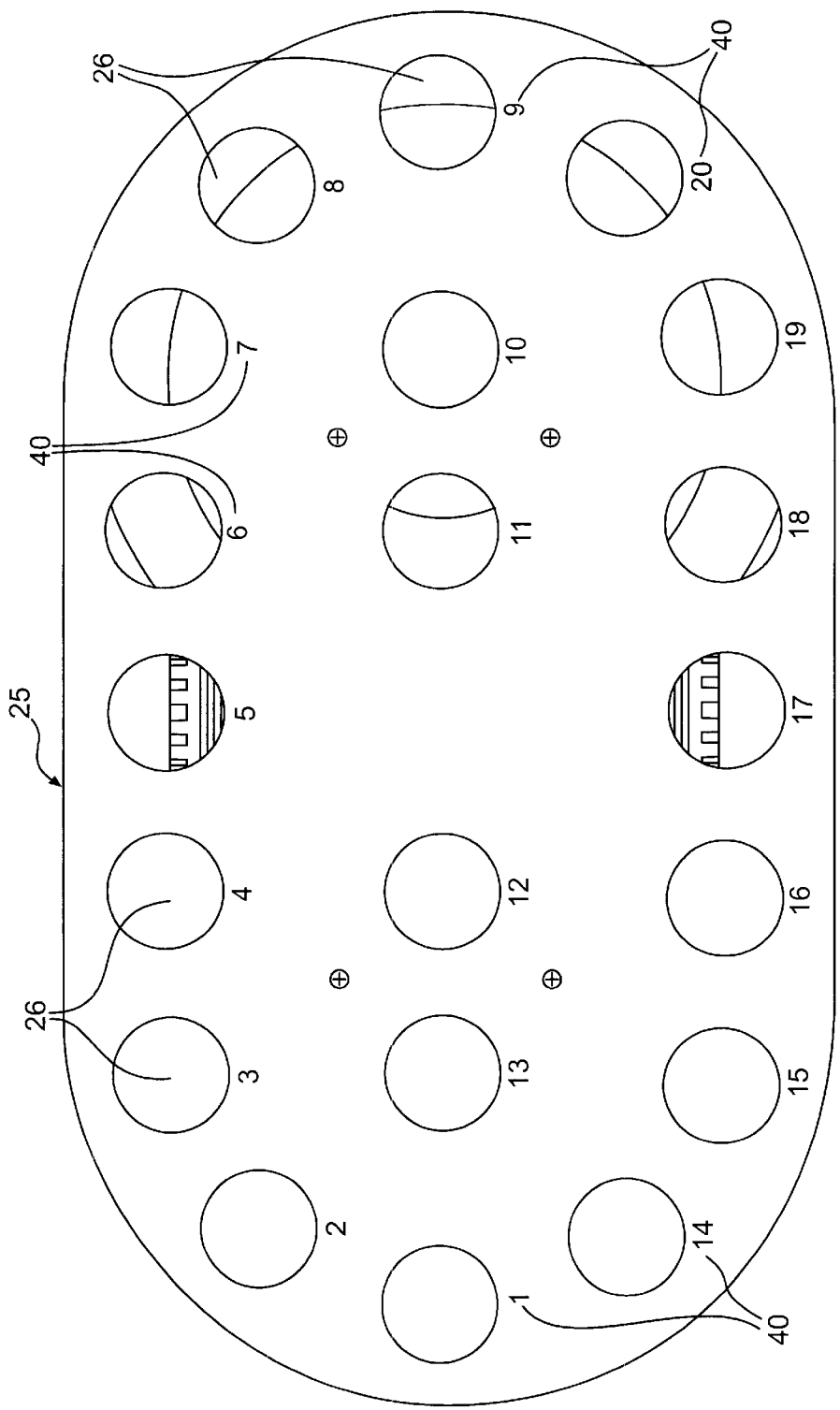
FIG. 4 is a top elevation view of the present invention wherein the cup holder is in the horizontal position.

FIG. 4 clearly displays the cup holder panel 25. The generally oval or racetrack shape of the panel 25 is merely convenient for the preferred embodiment. In this embodiment, the panel is fifteen and three-quarter inches wide and twenty-nine inches in length. The corners are rounded off to prevent any children, for instance, from being poked by a sharp edge. Further, the apertures 26 in the panel 25 are adapted to receive cups. In the embodiment illustrated in FIG. 4, there are numbers 40 that appear adjacent each of the apertures 26. There may be other types of written indicia adjacent each of the apertures. Other options might include names or athletic position, for instance. The apertures 26 are numbered 40 to allow a single person to place the cup that they are using within a preselected aperture. In this way, the cup may be reused and returned to the given aperture 26 so that there is no confusion and no spreading of germs. The apertures are also much more efficient holders so that litter is less of a problem.

The panel 25 as shown merely has apertures 26 to best hold cups. Other types of trays or cavities or wire basket-type holders may be used that have apertures or indentations or pockets to hold cups. The term "aperture" used herein is intended to cover these functionally equivalent variations. These cup holder variations are preferably simple and thin so as to not interfere with the portability and mobility of the cooler caddy.

While the invention has been described with reference to specific embodiments thereof, it will understood that numerous variations, modifications and additional embodiments are possible, and accordingly, all such variations, modifications, and embodiments are to be regarded as being within the spirit and scope of the invention.

What is claimed is:

1. A portable cooler caddy and cup holder comprising:

a frame comprising an upper frame portion and a lower frame portion, the upper frame portion being pivotally connected to an upper end of the lower frame portion for movement between a transport position in which the upper frame portion is coplanar with the lower frame portion and a cup holder position in which the upper frame portion extends perpendicular to the lower frame portion, an upper end of the upper frame portion being configured to form a handle while in the transport position;

a platform attached to a lower end of the lower frame portion and extending outwardly therefrom for supporting a cooler;

a plurality of wheels connected to the lower end of the lower frame portion, the platform and the wheels being configured for supporting the lower frame in a vertical orientation; and a cup holder panel having a plurality of apertures each adapted to receive and hold a cup, the cup holder panel being slidably connected to the upper frame portion for movement between a horizontal position overlying the handle when the upper frame portion is in the cup holder position and a vertical position in which the handle is exposed for use by a user when the upper frame portion is in the transport position.

2. The portable cooler caddy and cup holder described in claim 1, wherein the platform further comprises a support adapted to hold the platform in a substantially horizontal orientation when the frame is in an upright position.

3. The portable cooler caddy and cup holder described in claim 2, wherein the support has a length of at least six inches so that the platform is adapted to be at least six inches above the ground.

4. The portable cooler caddy and cup holder described in claim 1, wherein the panel further comprises indicia for differentiating each of the plurality of apertures.

* * * * *